June 4, 1929.  W. H. OVERHOLT ET AL  1,715,616
POTATO HILLER OR RIDGER
Original Filed Nov. 20, 1919  3 Sheets-Sheet 1
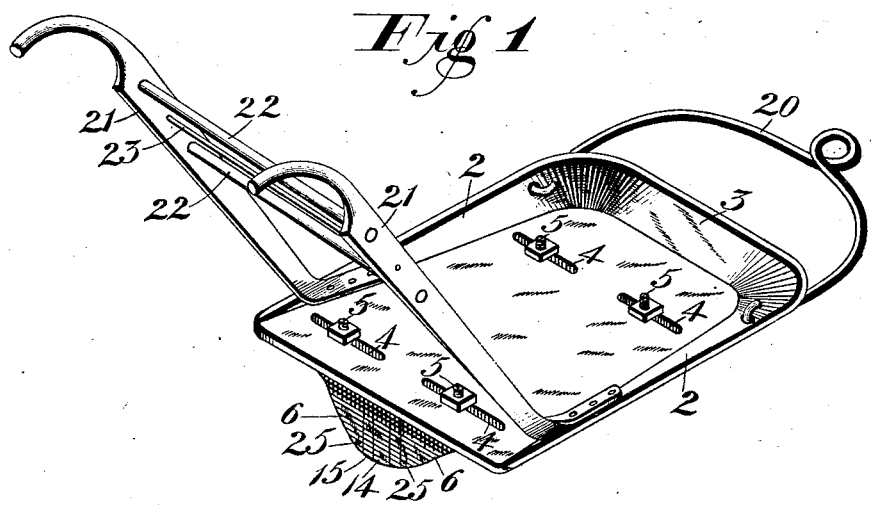
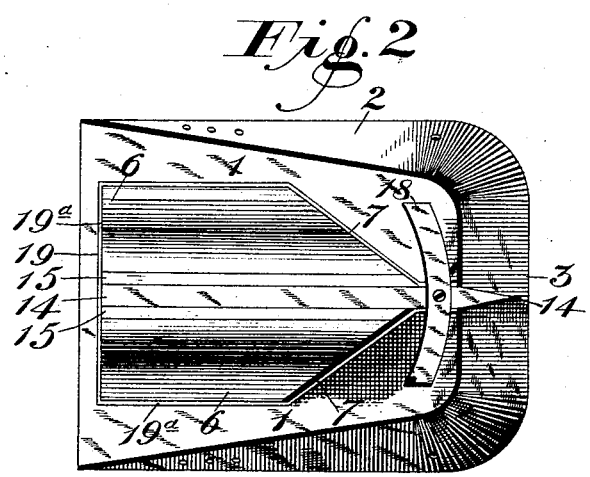
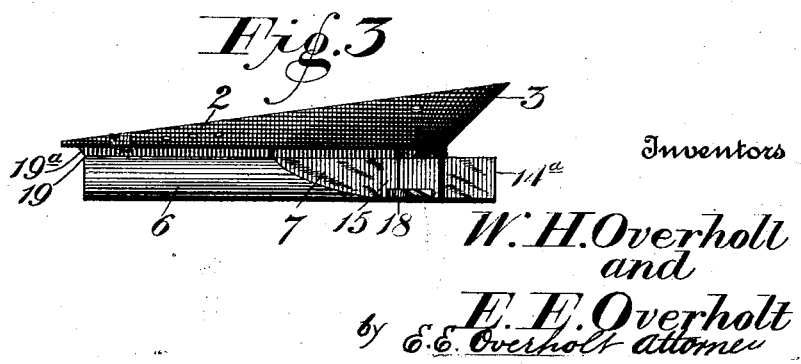
Inventors
W. H. Overholt
and
E. E. Overholt
by E. E. Overholt Attorney

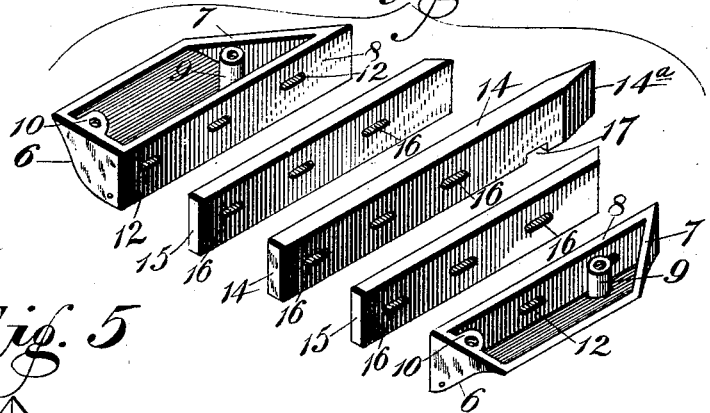
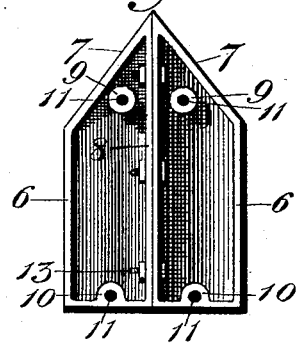
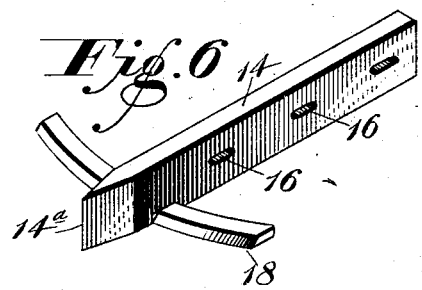
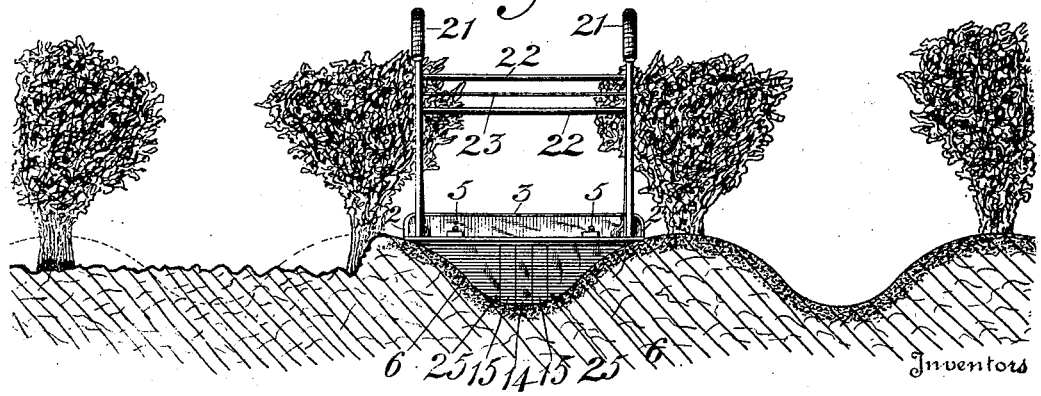

June 4, 1929.  W. H. OVERHOLT ET AL  1,715,616
POTATO HILLER OR RIDGER
Original Filed Nov. 20, 1919   3 Sheets-Sheet 3
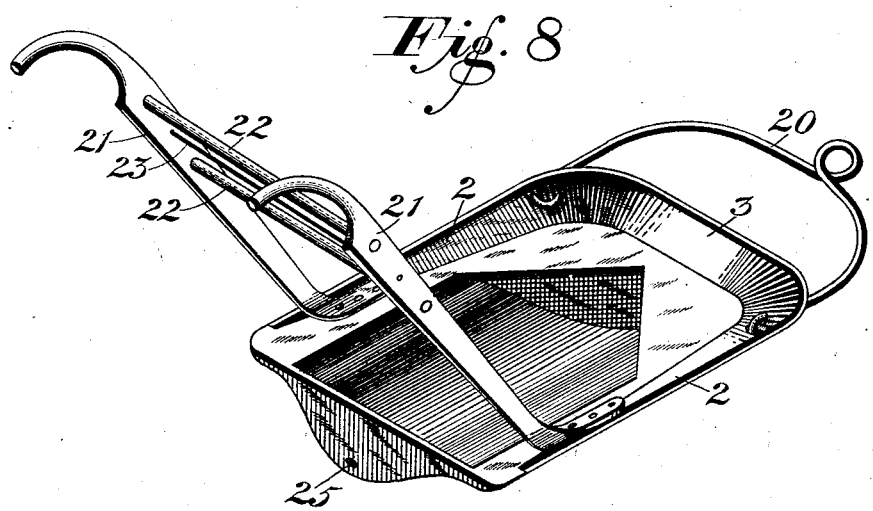
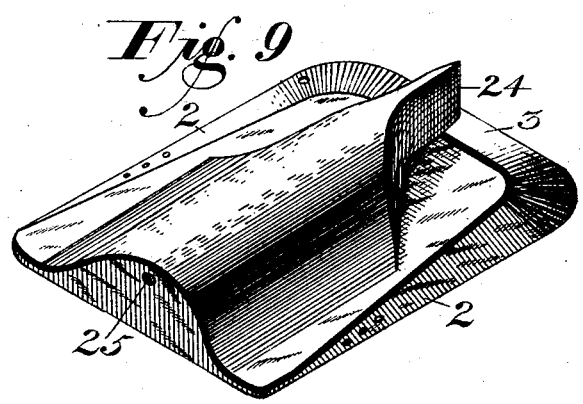
Inventors
W. H. Overholt
and
E. E. Overholt
by E. E. Overholt Attorney Patented June 4, 1929.

1,715,616

UNITED STATES PATENT OFFICE.

WILLIAM H. OVERHOLT, OF BLUEFIELD, WEST VIRGINIA, AND EDWIN E. OVERHOLT, OF WASHINGTON, DISTRICT OF COLUMBIA; SAID WILLIAM H. OVERHOLT ASSIGNOR TO SAID EDWIN E. OVERHOLT, OF WASHINGTON, DISTRICT OF COLUMBIA.

POTATO HILLER OR RIDGER.

Application filed November 20, 1919, Serial No. 339,413. Renewed August 18, 1928.

Our invention relates to soil ridgers.

The object is to provide a device of this character, employing any desired form of power, as for instance horse or motor power, for ridging up the rows of growing potatoes, cotton, and other crops requiring ridges; thereby avoiding the slow and laborious process of doing the work by hand; also for throwing up ridges preparatory to planting sweet potatoes, sea island cotton, and other crops requiring good seed beds.

Another object is to provide a device which will not only do the work vastly faster than it can be done by hand, but will do it far better than it can be done in that way by any amount of labor whatsoever.

Still another object is to provide a device of this character, which, while doing the work with great rapidity, will at the same time crush the clods leaving the soil nicely pulverized, and will also, in addition to this, provide the surface of the ridges with a layer or blanket of loose soil constituting a granular mulch which checks evaporation and retains in the soil the moisture which liberates plant food.

Further objects will appear in the subjoined description.

A leading feature of the invention consists of a lower member which parts the soil midway between the rows and forces it outwardly and upwardly into ridges, said lower portion merging into an upper portion projecting beyond the sides of the lower portion and cooperating therewith to give to the ridges their ultimate shape.

The invention consists in certain novel features of construction and arrangement of parts, as will be hereinafter described and claimed, reference being had to the accompanying drawings.

Referring to the drawings:—

Fig. 1 is a perspective view of one form of our invention.

Fig. 2 is a bottom plan view of Fig. 1, with the handles and hitching bail omitted.

Fig. 3 is a side elevation of Fig. 1 with said parts omitted.

Fig. 4 is a perspective view showing a two-piece bottom portion for the device, with additional pieces for adjusting the width of said bottom portion, the separate parts being shown spaced from each other ready to be assembled.

Fig. 5 is a top plan view of said bottom portion with the adjusting pieces omitted and the two pieces secured together, and ready to be secured to the upper portion.

Fig. 6 is a perspective view of the middle one of said adjusting pieces.

Fig. 7 is a rear elevation of our device as it appears at work in the field, the ground being shown in section to disclose the surface mulch formed by the machine.

Fig. 8 is a perspective view showing the body portion of the device formed in a single piece.

Fig. 9 is a bottom perspective of Fig. 8 with the handles and hitching bail omitted; and, Fig. 10 is a view illustrating an experiment for testing the effect of a dust mulch.

The upper or top portion of our device comprises the horizontal section 1, and the upturned side and front sections 2 and 3 respectively, the front section 3 being the highest and the side sections gradually tapering rearwardly therefrom till they merge into the section 1 at its rear end. The horizontal section 1 projects out over the under section of the device and is provided with the transverse adjusting slots 4, for the reception of the bolts 5 which connect the upper and lower portions of the device together.

The lower portion is formed, preferably, of two similar pieces 6 hollowed out or recessed, and each having a tapered front end 7 and an upturned flange 8 at its longest side, and a front and rear boss 9 and 10 respectively, said bosses having central threaded bores 11 for the reception of the screws or bolts 5. The flanges 8 are provided with elongated openings 12 into which are received the bolts 13 for rigidly securing together the two parts 6 forming the lower portion of the device, as shown in Fig. 5.

The horizontally extending part of the upper portion of the device is narrowest at its forward end and gradually broadens as it extends rearwardly, and has its front and side margins inclined upwardly, the front incline being broadest and the side inclines gradually diminishing in width as they extend rearwardly, the width and degree of inclination of said respective inclines, and the degree of taper of the side inclines being adapted to compensate for the gradual taper of said horizontal portion sufficiently to render said upper projecting portion of the device, as a whole, of even width throughout its length, when seen in plan view.

Sometimes it is desirable to make the ridges more than the ordinary width apart, in which case it may also be found desirable to make the lower portion of our device wider, and this is done by means shown specially in Figs. 2, 4, and 7, in which the two pieces 6 on the under side of the device, have interposed between them a central spacing bar 14 and two auxiliary spacing bars 15—one at each side of said central bar 14. These spacing bars are all provided with elongated openings 16 adapted to register with each other and with the elongated openings 12 of the parts 6. When it is desired to make the lower portion of the device only slightly wider than its normal width, the central spacing bar 14 alone is used, while for wider adjustments the auxiliary bars 15 are employed. While only three of these spacing bars are shown it is understood that more may be used if necessary; and that they may be made of any desired thickness. The central bar 14 is provided with a sharpened front end 14ª to cause the device to cut its way more easily through the soil. The openings in the spacing bars and the flanges 8 of the parts 6 are elongated to permit longitudinal adjustment of the bars according to the number and thickness of the bars used, it being understood that the auxiliary bars are to be so adjusted as to cause their front ends to form a continuous surface with the inclined faces 7 of the parts 6, as shown in Fig. 2.

The central spacing bar 14 is provided near its forward end on its under side with a transverse recess 17 for the reception of a plow or share 18 which may be used with the device when desired.

In making unusually high ridges, if it should ever be found desirable to slightly increase the vertical thickness of the under side of our device, the same may be conveniently done by inserting the spacing slab 19 between the upper and lower parts as illustrated in Figs. 2 and 3. This slab is generally of the same general contour as the upper margin of the under portion of our device and is preferably beveled around its outer edge or margin, as indicated at 19ª in Figs. 2 and 3, to cause it to merge, as it were, into the under face of the upper projecting portion of the device. This slab 19 may be made of any desired thickness, and more than one slab may be used if desired. The spacing bars may be made of wood, if preferred, especially the auxiliary bars 15.

The upper portion of the device is provided with a hitching bail 20 near its forward end, and near its rear end has handles 21 suitably secured to the device and connected together by the rungs 22 and rod 23.

In Figs. 8 and 9 we have shown a slightly modified form of our device, in which the upper and lower portions are both formed in a single piece, and the lower portion terminates at its forward end in a thin nose piece 24 coming to an edge at its forward end, to enable the device to easily cut its way through the soil. However, the device works thoroughly well if the lower portion simply comes to a tapered point, as illustrated in Fig. 5.

In both forms of the device the lower portion is provided at the rear end with drainage means consisting of openings 25, to permit the escape of water when the device is rained upon. However, the rear end of the under portion of the device may be left open if desired, especially in the form of the device shown in Figs. 8 and 9.

The operation of our device is very simple and need only be described as used for ridging up growing crops, the potato or other crop with which it is to be used, is usually first plowed in the ordinary way with a shovel plow, and then our device is drawn midway between the rows, as indicated in Fig. 7, to throw up the soil into ridges. The operator can follow the device as he would a plow, when only shallow ridges are desired, but when deep ridges are wanted, he can stand on the device; and standing forward of the centre will cause the nose of the machine to dig still more deeply into the earth while leaning back against the rungs 22 which connect the handles causes the forward end of the machine to incline slightly upwardly, and thereby gives a somewhat shallower furrow, according to the degree of upward inclination. Hence the height of the ridges can be quickly varied to suit places in the rows where the vines are small, and other places where they are rank and large; and these changes, however frequent they may be can be made without stopping the machine, only requiring the operator to stand forwardly or rearwardly on the machine as the case may require. The lower portion of the device noses its way through the loose soil and easily forces it to right and left forming the lower part of the ridges, while the upper part of the device limits the upward movement of the soil at the front and sides of the lower part, and cooperates with the lower part to further spread the soil outwardly and to give ultimate shape and conformation to the ridges.

From the foregoing it is at once apparent that our device is a great time saver, because of the rapidity with which it does its work.

However, valuable as the time saving feature of our device is, attention is called to another feature of great importance and significance, namely:—It is well known to scientific farmers that a good mulch formed on top of the ground in a cultivated field is the best known means of preventing the escape of moisture and also of nitrates from the soil. Now, our device does that to perfection. In nosing its way through the soil and forcing the same upwardly and outwardly in contact with the sides and projecting top of the device, it pulverizes the soil and forms on its top a most excellent granular mulch, and leaves the ridges in a smooth and even condition and slightly compressed like a wheat field after a drag has been run over it, so that they not only conserve the moisture and nitrates in the soil, but are also less liable to be washed down by heavy rains afterwards than if the work had been done with hoes in the ordinary way, which leaves the surface of the ridges rough and uneven and uncompressed, ready to be washed down by the first heavy rain that comes. Hence our machine does the work better than it is possible to do it by hand, aside from the other fact that it does it with great rapidity. At one operation it not only hills the potatoes but thoroughly drags the ground. Any experienced farmer knows what it means to a newly sown wheat field to be dragged, and it is quite as advantageous to a potato field as to a wheat field, since potatoes are more responsive to a proper amount of moisture than wheat.

The great value of a granular mulch on top of the soil for the conservation of moisture may be most easily demonstrated by taking a lump of hard clay or a cube of loaf sugar as indicated at 26 in Fig. 10 of the drawings, and placing the same in a pan 27 and covering it deeply with a mass of dust or powdered sugar 28, and then pouring water into the pan 27 the water will quickly rise through the lump or cube 26 till the finely powdered mass 28 of dust or sugar at its top is reached, but there it will stop, showing that the mass of powdered material will hold down the moisture.

Now, in view of the fact here proved, it becomes apparent that with our device a crop of potatoes may be raised in soil where it is too dry for the growing of potatoes to advantage when the soil is ridged up by hand in the ordinary way, and also in some localities where the moisture is so scant that level cultivation with its disadvantages has heretofore been considered compulsory as a means of conservation of moisture.

While our device is ordinarily intended to follow a plow or cultivator, it will yet work where no plow is used. This is especially the case when we employ the plow or cutter 18 shown in Figs. 2, 3, and 6, which cuts through the soil entirely separating the upper stratum from the lower so that the former can be easily thrown out sideways into ridges. The plow may be made shorter or longer according to the width of the rows apart.

After the potatoes have been laid by, and a plow can no longer be used, this device can be run between the rows to crush down and destroy weeds to prevent them from seeding.

When it is desired to increase the capacity of the device for breaking clods as the ground is thrown up into ridges, the position of the lower portion 6, on the horizontal plate 1 of the upper portion, is reversed. That is to say; the flat end of the lower portion 6, which end normally faces rearwardly, is now caused to face forwardly, and is secured to the plate 1 by the usual bolts 5 with the threaded openings of the bosses 10 in registration with the transverse slots 4 at the forward end of the plate 1, and with the threaded openings of the bosses 9 in registration with the slots 4 at the rear end of said plate.

For working ground that is normally cloddy, the forward end of the lower portion 6 which is usually tapered to a point as shown, may be made flat, just as is the rear end.

Having now set forth the principles of our invention, and shown means for practically embodying the same, we yet do not limit ourselves to the exact showing made, but claim protection on all that comes within the spirit and scope of our invention.

What we claim is:—

1. A ridge-forming and cultivating implement having an upper member for resting on the ground; and a lower cooperating member for running through the soil underneath said upper member and extending downwardly therefrom for a material distance, and normally increasing in width from its lower part to its upper part; said lower member having means for forcing the soil outwardly and upwardly above the normal level of the ground.

2. A ridge-forming and cultivating implement having an upper portion for resting on the soil; and a lower cooperating portion for running through the soil underneath said upper portion and extending downwardly therefrom a material distance and of a width materially greater than its depth and normally decreasing in width from its top to its bottom; said upper portion projecting horizontally beyond the lower portion; the lower portion being constructed at its forward end to open up and loosen the soil and rearwardly from said forward end having a follow-up portion for progressively filling said opening as it is made in the soil by the forward end, whereby to force the displaced soil outwardly and upwardly as the implement advances through the soil, said follow-up portion being materially elongated and having its sides parallel with each other and with the cooperating face of the adjacent upper portion, whereby, as the machine advances, to bring said parts into prolonged abrasive contact with the surface of the soil to form a mulch thereon.

3. A ridge-forming and cultivating implement, comprising a plate for running above the ground; and a cooperating member underneath said plate extending downwardly a material distance therefrom, and being of a width materially greater than its depth and normally decreasing in width from its top to its bottom, and constructed at its forward end for forcing the soil outwardly and upwardly, said plate being turned upwardly at its forward end.

4. A ridge-forming and cultivating implement having an upper portion for resting on the ground; and a lower cooperating portion for running through the soil underneath said upper portion and extending downwardly therefrom a material distance, said upper portion projecting horizontally beyond said lower portion, said lower portion being provided at its forward end with means for forcing the soil outwardly and upwardly above the normal level of the ground, the upper projecting portion being constructed to engage the top portion of the upheaved soil to further spread said portion laterally outward, the device rearwardly of its forward end being materially elongated and of uniform cross-sectional formation to thereby form a loose mulch.

5. A ridge-forming and cultivating implement, comprising a plate for resting on the soil in face to face engagement therewith; a cooperating member underneath said plate and extending downwardly a material distance therefrom, said plate projecting laterally beyond said under member and having its side margins turned upwardly and outwardly, said upturned margins increasing in width from the rear end of the plate forwardly, the width of said under member being approximately equal to that of the forward end of the flat plate between its upturned side margins, and constructed at its forward end for upheaving the soil.

6. A ridge-forming and cultivating implement, comprising an upper portion for running on top of the ground; and a lower portion underneath the upper portion and extending downwardly a material distance therefrom, and constructed at its forward end to force the soil outwardly and upwardly, said lower portion being formed in sections; and means for operatively securing said sectional lower portion to the upper portion, the upper portion extending horizontally beyond the lower portion.

7. A ridge-forming and cultivating implement comprising an upper portion for running on top of the ground; and a lower portion underneath the upper portion and extending downwardly a material distance therefrom, and constructed at its forward end to force the soil outwardly and upwardly, said lower portion being formed in sections; a spacing bar between said sections with its forward end extending in advance thereof and provided with a vertical cutting edge, said upper portion projecting horizontally beyond said lower portion; and means for securing said parts in operative relation to each other.

8. A ridge-forming and cultivating implement having a plate with its main portion flat; and a cooperating member underneath said plate extending downwardly a material distance therefrom, and constructed at its forward end to force the soil outwardly and upwardly, said plate projecting horizontally beyond said lower portion and having its front and side margins inclined upwardly, the front incline being broadest and the side inclines gradually diminishing in width as they extend rearwardly, the width and degree of upward inclination of said respective inclines being arranged to render said plate as a whole, of even width throughout its length when seen in plan view, the width of the lower cooperating member being approximately equal to that of the forward end of the flat portion of the plate.

9. A ridge-forming and cultivating implement, comprising an upper portion for resting on the soil; and a reversible lower portion detachably secured to the under side of said upper portion and extending downwardly a material distance therefrom, the upper portion projecting laterally beyond the lower portion, said reversible portion having parallel sides and being constructed at either end for upheaving the soil; and means for securing the reversible portion to the top portion with either end forward.

10. A ridge-forming and cultivating implement comprising an upper portion for resting on the soil; and a reversible lower portion detachably secured to the under side of said upper portion and extending downwardly a material distance therefrom, the upper portion projecting laterally beyond the lower portion, said reversible portion having parallel sides and approximately vertical ends, said ends being convergent at one end of the member and flat at the other; and means for securing the reversible portion to the top portion with either end forward.

11. A ridge-forming and cultivating implement having an under portion for running through the soil; and an upper portion for running above ground, the under portion extending downwardly a material distance from the upper portion and being of a width materially greater than its depth, and constructed at its forward end for forcing the soil upwardly and outwardly; and means for varying the width of said under member.

12. A ridge-forming and cultivating implement having an under portion for running through the soil; and an upper portion for running above ground, the under portion extending downwardly a material distance from the upper portion and being of a width materially greater than its depth, and constructed at its forward end for forcing the soil upwardly and outwardly; and means for varying the thickness of said under member.

In testimony whereof we affix our signatures.

WILLIAM H. OVERHOLT.
EDWIN E. OVERHOLT.